(12) United States Patent
Demirtas et al.

(10) Patent No.: US 8,905,489 B2
(45) Date of Patent: Dec. 9, 2014

(54) WASHING ELEMENT FOR A WASHING SYSTEM AND METHOD FOR MANUFACTURING A WASHING ELEMENT

(71) Applicant: Alfred Kärcher GmbH & Co. KG, Winnenden (DE)

(72) Inventors: Yunus Demirtas, Kornwestheim (DE); Alfred Losansky, Waiblingen (DE)

(73) Assignee: Alfred Kärcher GmbH & Co. KG, Winnenden (DE)

( * ) Notice: Subject to any disclaimer, the term of this patent is extended or adjusted under 35 U.S.C. 154(b) by 0 days.

(21) Appl. No.: 14/051,731

(22) Filed: Oct. 11, 2013

(65) Prior Publication Data

US 2014/0033464 A1  Feb. 6, 2014

Related U.S. Application Data

(63) Continuation of application No. PCT/EP2012/056660, filed on Apr. 12, 2012.

(30) Foreign Application Priority Data

Apr. 13, 2011 (DE) .................. 10 2011 007 326

(51) Int. Cl.
*B60S 3/06* (2006.01)
*A46D 1/00* (2006.01)
*A46B 13/00* (2006.01)
*B29C 44/56* (2006.01)
*B29C 59/02* (2006.01)

(52) U.S. Cl.
CPC ............ *B29C 59/026* (2013.01); *A46D 1/0207* (2013.01); *A46B 13/005* (2013.01); *B60S 3/06* (2013.01); *A46B 2200/3046* (2013.01); *B29C 44/5627* (2013.01)
USPC ........................... 300/21; 15/97.3; 15/230.16

(58) Field of Classification Search
USPC ................ 15/53.2, 97.3, 230.16; 300/21
See application file for complete search history.

(56) References Cited

U.S. PATENT DOCUMENTS

| 2,879,631 | A  | * | 3/1959  | Peterson ................. 451/529 |
| 5,077,859 | A  | * | 1/1992  | Ennis ...................... 15/230 |
| 5,884,356 | A  |   | 3/1999  | Zigerlig |
| 7,152,269 | B1 |   | 12/2006 | Windel |
| 7,805,798 | B2 |   | 10/2010 | Belanger |
| 2004/0010878 | A1 | | 1/2004 | Levesque |
| 2008/0078048 | A1 | * | 4/2008 | Belanger ............. 15/230.16 |

FOREIGN PATENT DOCUMENTS

| AU | 725783 | 11/1998 |
| DE | 20 2011 005 643 | 10/2011 |
| EP | 0 787 446 | 6/2000 |
| EP | 0 971 611 | 11/2001 |
| WO | WO 2008/032344 | 3/2008 |

* cited by examiner

*Primary Examiner* — Randall Chin
(74) *Attorney, Agent, or Firm* — Womble Carlyle Sandridge & Rice, LLP

(57) ABSTRACT

A washing element for a washing system is provided, in particular an automatic motor vehicle washing system, wherein the washing element is formed by a foam material. To provide a washing element of this kind wherein the risk of damage to the article to be washed can be reduced, the washing element is a foam sheet which has at least on one side a skin, wherein the skin is provided, at least in certain sections, with a surface texturing.

17 Claims, 5 Drawing Sheets

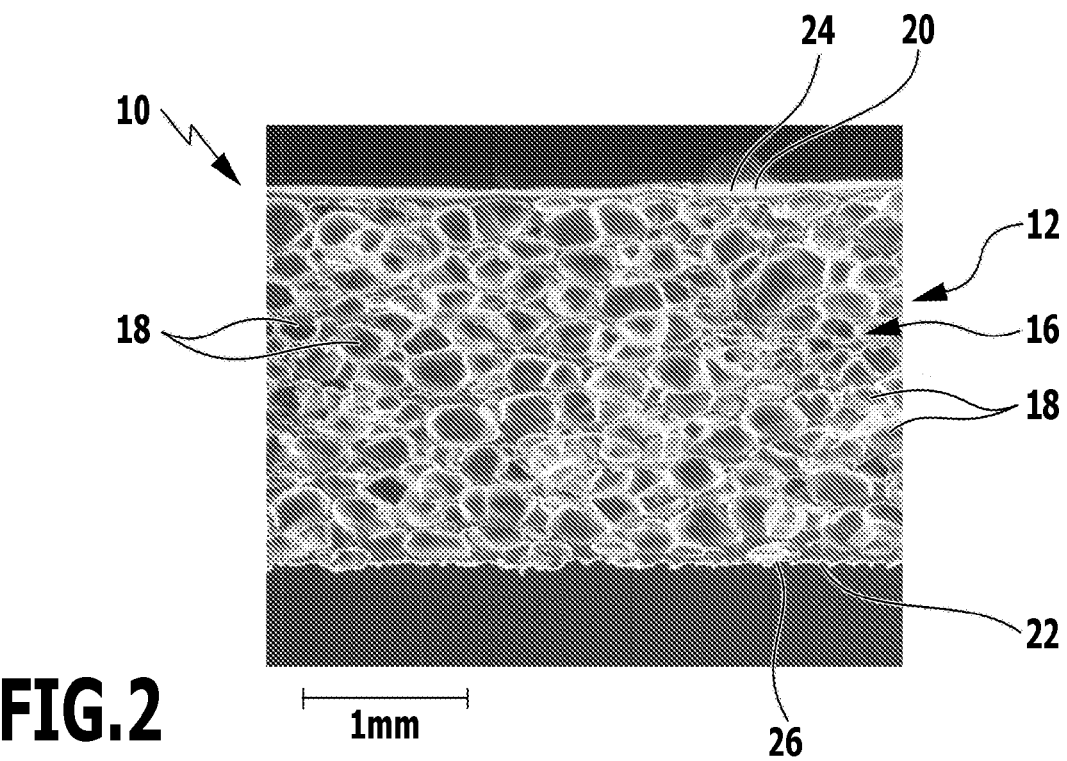
FIG.2 ⊢ 1mm ⊣
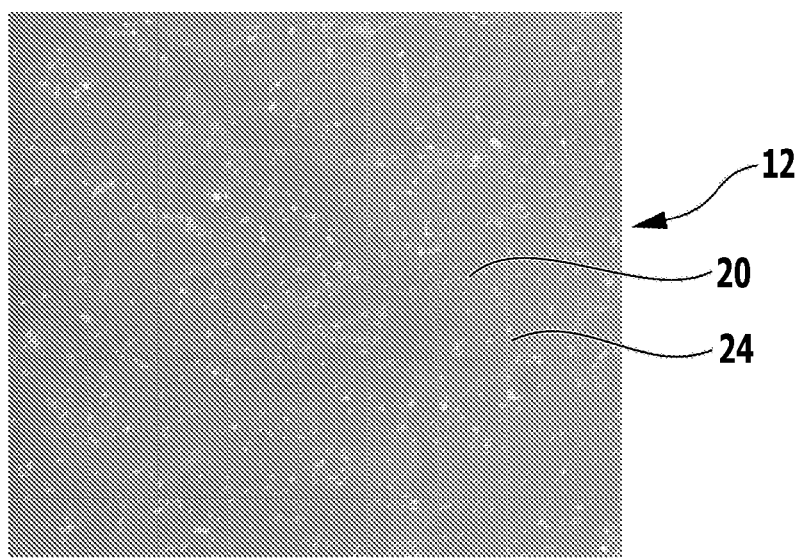
FIG.3 ⊢ 1mm ⊣

WASHING ELEMENT FOR A WASHING SYSTEM AND METHOD FOR MANUFACTURING A WASHING ELEMENT

CROSS-REFERENCE TO RELATED APPLICATIONS

This application is a continuation of international application No. PCT/EP2012/056660, filed on Apr. 12, 2012, and claims the benefit of German application number 10 2011 007 326.4, filed Apr. 13, 2011, which are incorporated herein by reference in their entirety and for all purposes.

FIELD OF THE INVENTION

The present invention relates to a washing element for a washing system, in particular an automatic motor vehicle washing system, the washing element being formed by a foam material.

Further, the present invention relates to a method for manufacturing a washing element for a washing system.

BACKGROUND OF THE INVENTION

With washing systems and in particular motor vehicle washing systems, it is known to use washing elements formed by a cellular foam material. To manufacture washing elements of this kind, the foam material in the form of blocks is conventionally cut into individual lengths or strips, each of which constitutes a washing element. When the foam material in blocks is cut up, washing elements whereof the surfaces include opened cells of foam material are produced. This allows a washing liquid such as water to be readily absorbed by washing elements of this kind, which is advantageous for the cleaning action that can be achieved with the washing elements. In practice, however, the problem arises that dirt particles can collect in the opened cells of the washing element. This can result in damage to the article to be washed, in particular a motor vehicle, if the washing element is used in a motor vehicle washing system.

An object underlying the present invention is to provide a washing element of the type mentioned in the introduction and a method for manufacturing a washing element using which the risk of damage to the article to be washed can be reduced.

SUMMARY OF THE INVENTION

In a first aspect of the invention, a washing element for a washing system, in particular an automatic motor vehicle washing system, is formed by a foam material. The washing element includes a foam sheet which has at least on one side a skin, wherein the skin is provided, at least in certain sections, with a surface texturing.

In a second aspect of the invention, a method for manufacturing a washing element for a washing system includes providing a foam sheet which has a skin on at least one side and subjecting the foam sheet to at least one surface treatment step in which the skin is provided at least in certain sections with a surface texturing, increasing its surface roughness.

BRIEF DESCRIPTION OF THE DRAWING FIGURES

The foregoing summary and the following description may be better understood in conjunction with the drawing figures, in which:

FIG. 2 shows a side view of the washing element in FIG. 1, in a region not provided with a surface texturing;

FIG. 3 shows a plan view of the washing element in FIG. 1, in a region not provided with a surface texturing;

DETAILED DESCRIPTION OF PREFERRED EMBODIMENTS OF THE INVENTION

Figure 1:
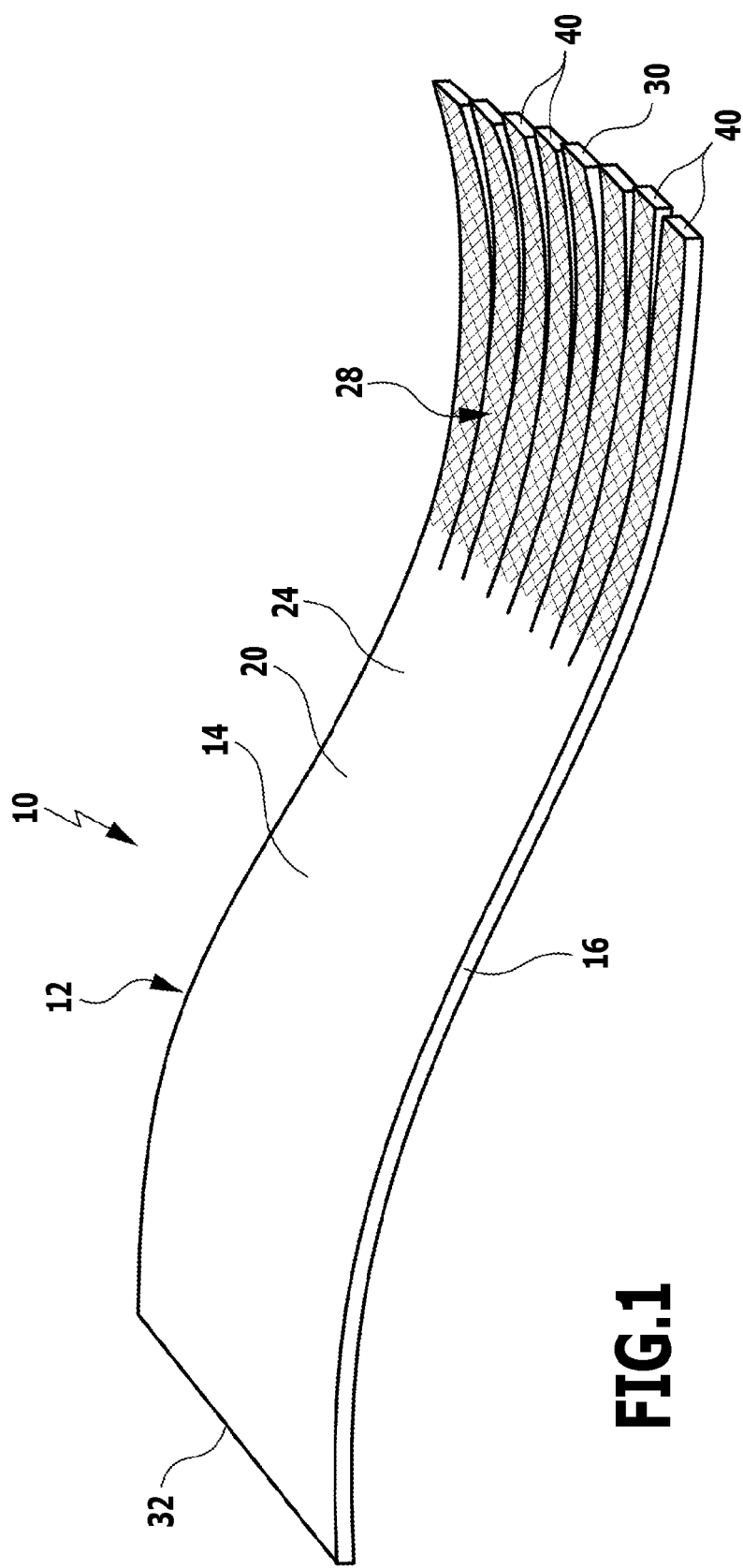
FIG. 1 shows a schematic perspective illustration of a first preferred embodiment of a washing element in accordance with the invention.

Although the invention is illustrated and described herein with reference to specific embodiments, the invention is not intended to be limited to the details shown. Rather, various modifications may be made in the details within the scope and range of equivalents of the claims and without departing from the invention.

The present invention relates to a washing element for a washing system, in particular an automatic motor vehicle washing system, wherein the washing element is formed by a foam material. The washing element includes a foam sheet which has at least on one side a skin, wherein the skin is provided, at least in certain sections, with a surface texturing.

In the washing element in accordance with the invention, a foam sheet is used which includes a core formed by expanded material and, on at least one of its surfaces, a skin The skin may be formed on the foam sheet during manufacture and for this reason is also called "a foam process skin". Because of the skin, the foam sheet forms a closed-cell material, with the result that no dirt particles which could lead to damage to the article to be washed can collect on the skin. In addition, the skin of the washing element is provided at least in certain sections with a surface texturing. In the region of the surface texturing, the skin is provided with peaks and valleys, with the result that in the region of the surface texturing it has a surface roughness which is greater than the roughness of the foam sheet without a surface texturing. In practice it has been found that the construction of the surface texturing can significantly increase the wettability by washing liquid of the foam sheet, which is otherwise largely liquid-repellent. Moreover, the mechanical removal of dirt from the article to be cleaned is improved as a result of the surface texturing. This makes it possible to achieve a high level of cleaning action with the washing element in accordance with the invention.

The surface texturing can be formed on the skin for example by performing a mechanical action on the foam sheet, for example by embossing the foam sheet using a template or die that determines the surface texturing.

It is favorable if the foam sheet has a skin on both sides. This has the effect that the foam sheet is formed to have closed cells on both sides, with the result that dirt particles can be prevented from collecting in cells in the foam core on both sides of the foam sheet.

Preferably, the two skins are each provided with a surface texturing in certain sections. This allows the wettability of the foam sheet and the suitability thereof for mechanical removal of dirt to be increased on both sides. This has the result that the cleaning action that can be achieved with the washing element is enhanced.

The skin or skins of the foam sheet are provided, at least in certain sections, with the surface texturing, which is preferably arranged in the region of the washing element that actively participates in washing. The region of the washing element that actively participates in washing is the region that can come into contact with the article to be washed.

In an advantageous embodiment of the washing element in accordance with the invention, it is favorable if at least one skin and preferably both skins of the foam sheet is or are completely provided with the surface texturing. This enables the wettability of the foam sheet and the suitability thereof for mechanical removal of dirt to be enhanced over the entire skin or skins.

Preferably, the surface roughness of the skin in the region of the surface texturing is of the same value or substantially the same value. This enables the foam sheet to be wetted with washing liquid evenly or substantially evenly in the region of the surface texturing, and to remove dirt evenly from the article to be cleaned. This provides the possibility of cleaning the article to be washed as evenly as possible. Moreover, the washing element can be manufactured more simply.

In a concrete implementation of the washing element in accordance with the invention, it has proved advantageous in practice if the skin has a surface roughness in the region of the surface texturing of approximately 50 µm to approximately 1000 µm, preferably of approximately 100 µm to approximately 500 µm and more preferably of approximately 200 µm to approximately 400 µm, measured as variable Sz in Part 2 of ISO standard 25178. In accordance with the definition of surface roughness Sz in Part 2 of ISO standard 25178, the sum of the deepest valley and the highest peak in the region of the skin provided with the surface texturing is, favorably, approximately 50 µm to approximately 1000 µm, preferably approximately 100 µm to approximately 500 µm and particularly preferably approximately 200 µm to approximately 400 µm. In practice it has been found that, if a surface texturing having the above-mentioned value is chosen, on the one hand the wettability of the skin with washing liquid can be ensured and on the other it is also very largely possible to prevent dirt particles from collecting on the foam sheet while maintaining its improved suitability for removing dirt particles from the article to be cleaned.

It is advantageous if the surface texturing is formed to be regular, at least in certain regions, in order to simplify manufacture of the washing element. The surface texturing is preferably regular in respect of the surface roughness and/or the arrangement of peaks and valleys on the skin. Preferably, the surface texturing is formed to be regular overall.

In practice, it has proved favorable if the spacing between adjacent valleys in the surface texturing and/or the spacing between adjacent peaks in the surface texturing are of the same size or substantially the same size. This simplifies manufacture of the washing element and enables the washing element to be wetted with washing liquid as evenly as possible and to remove dirt mechanically as evenly as possible. It is favorable if the respective spacing is less than 3 mm, preferably less than 2 mm and more preferably less than 1 mm.

In a particularly preferred embodiment of the washing element in accordance with the invention, it has proved favorable in practice if the spacing between adjacent valleys and/or the spacing between adjacent peaks is in each case approximately 500 µm to approximately 600 µm. The surface roughness of the skin in the region of the surface texturing, defined as above as variable Sz, is in this case favorably approximately 100 µm to approximately 250 µm.

In a further advantageous embodiment of the washing element in accordance with the invention, it has proved advantageous in practice if the spacing between adjacent valleys and/or the spacing between adjacent peaks is approximately 1.5 mm to approximately 2.5 mm. The surface roughness of the skin in the region of the surface texturing, defined as above as variable Sz, is in this case favorably approximately 200 µm to approximately 500 µm.

A regular surface texturing can be achieved for example in that the surface texturing is formed periodically along the skin in at least one first spatial direction, preferably in two spatial directions oriented transversely to one another.

Preferably, the surface texturing is configured as a grid-like structure, ribbed structure, scale-like structure or pimpled structure. This allows the skin to be provided with the surface texturing simply, from a constructional point of view, for example by embossing the foam sheet.

It is favorable if the washing element is divided into strips, at least in certain sections. For example, the washing element may have an edge starting from which it is divided into a plurality of strips arranged next to one another. The strips may be formed for example by cutting into the foam sheet. In practice, it has proved advantageous if the strip width is at least approximately 4 mm, in particular with a thickness of the foam sheet of approximately 2 mm to approximately 4 mm. This reduces the likelihood that dirt particles will collect in the opened cells in the foam core of the foam sheet which are arranged on the sides of the strips not coated with a skin.

Preferably, the strips of the foam sheet are provided with a surface texturing. In particular, the strips form the region of the washing element that actively participates in washing.

It has proved advantageous if the foam sheet is a polyolefin foam sheet containing ethylene vinyl acetate or composed of ethylene vinyl acetate.

The foam sheet advantageously has a density of approximately 100 kg/m$^3$ to approximately 200 kg/m$^3$.

As mentioned in the introduction, the present invention further relates to a method for manufacturing a washing element for a washing system. The method includes providing a foam sheet which has a skin on at least one side and subjecting the foam sheet to at least one surface treatment step in which the skin is provided at least in certain sections with a surface texturing, increasing its surface roughness.

Because the skin of the foam sheet is provided with the surface texturing in a manner increasing its surface roughness by comparison with the foam sheet not subjected to the surface treatment step, the wettability by washing liquid of the foam sheet is enhanced, while at the same time retaining the closed-cell construction of the foam sheet in order to prevent dirt particles from collecting. Moreover, the mechanical removal of dirt from the article to be cleaned is improved as a result of the surface texturing.

It is favorable if the surface texturing is formed by embossing the foam sheet. For example, the surface texturing is formed by hot stamping, by heating a template or die that is of grid form, strip form or provided with blind holes and pressing it against the skin. This enables a grid-like, strip-like or pimpled surface texturing of the skin to be achieved.

It may be provided that the foam sheet is then, in a further treatment step, partly cut into or cut up. For example, the foam sheet is provided with a plurality of cuts extending next to each other and starting from one of its edges. This enables the manufacture of a washing element which in certain sections is divided into a plurality of strips.

It may also be provided that the foam sheet is cut completely into individual strips which are then grouped together into a bundle of washing elements.

FIG. 1 shows, in a perspective schematic illustration, a first preferred embodiment of a washing element which overall is designated by the reference numeral 10. The washing element 10 is manufactured from a foam sheet 12 in the form of a material strip 14.

The foam sheet 12 includes a foam core 16 of expanded foam material including cells 18. The foam core 16 is coated, on both mutually opposing surfaces 20 and 22 of the foam sheet 12, with a respective skin 24 and 26. The foam material is for example a polyolefin foam containing ethylene vinyl acetate or composed of ethylene vinyl acetate. The skins 24 and 26 may already be formed during manufacture, that is during expansion of the foam sheet 12, for which reason they are also called "foam process skins". Because of the skins 24 and 26, the foam sheet 12 is a closed-cell material in which the cells 18 at the surfaces 20 and 22 are covered by the skins 24 and 26 enclosing them.

FIGS. 2 and 3 show the foam sheet 12 after expansion, in the starting condition of manufacturing the washing element 10, in a side view and a plan view respectively. It can be seen that the foam sheet 12 is formed to be smooth on both sides, having substantially planar skins 24 and 26 with no texturing.

Because the foam sheet 12 has closed cells, in the case of the washing element 10 dirt particles can be prevented from penetrating into the cells 18 covered by the skins 24 and 26 and collecting therein. Dirt particles cannot adhere to the skins 24 and 26 either. As a result, using the foam sheet 12 for the washing element 10, damage to the article to be washed, for example a motor vehicle, can largely be avoided.

In order to enhance the cleaning action of the washing element 10, it is provided over part of its length in relation to the length of the material strip 14 with a surface texturing 28. The surface texturing 28 is indicated by hatching in FIG. 1 and can be seen only on the surface 20. Starting from a first short side 30 of the material strip 14, the surface texturing 28 extends along the surfaces 20 and 22 in the direction of a second short side 32 of the material strip 14.

Figure 4:
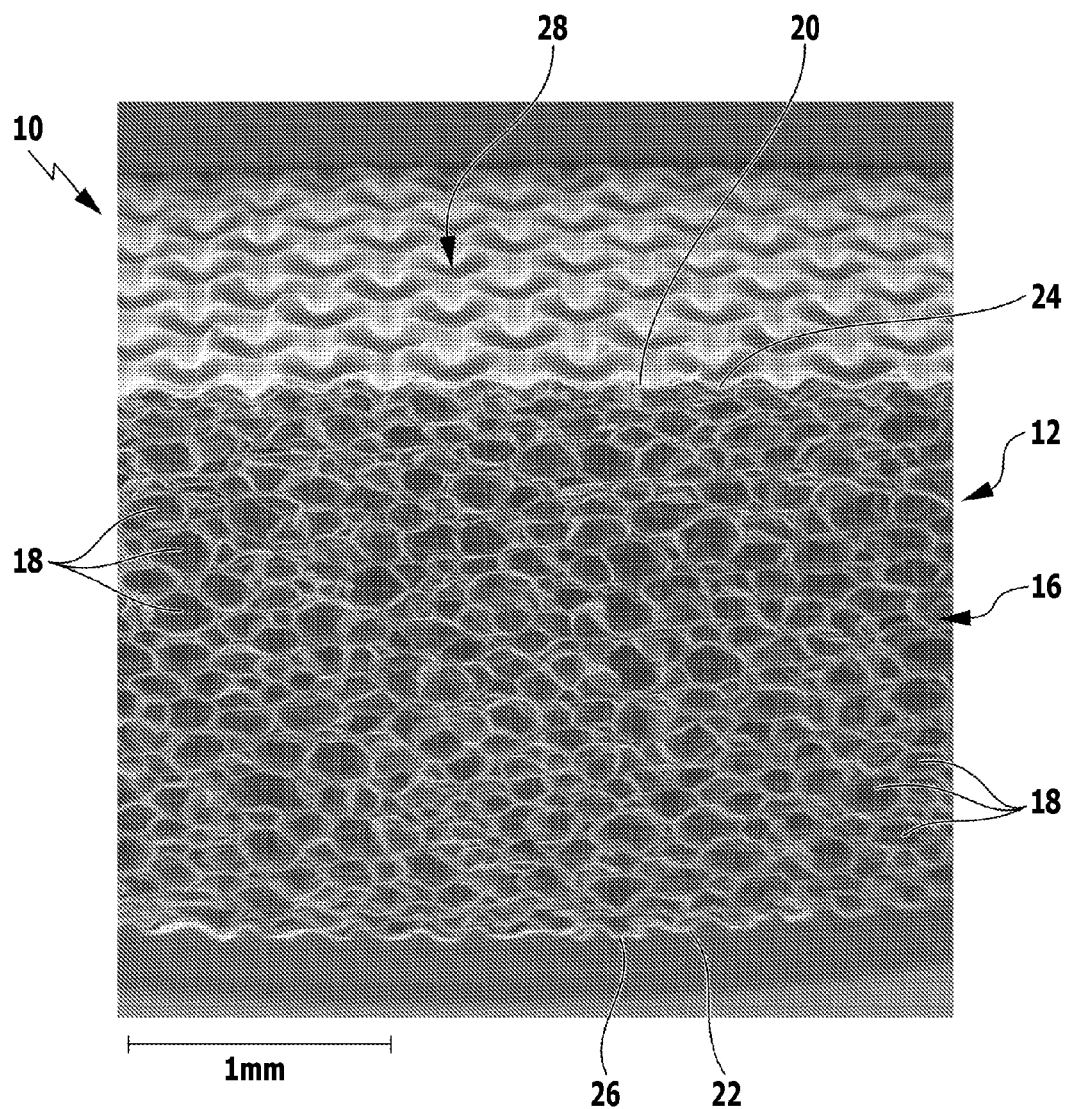
FIG. 4 shows a side view of the washing element in FIG. 1, in a region provided with a surface texturing, from an oblique angle of view.
Figure 5:
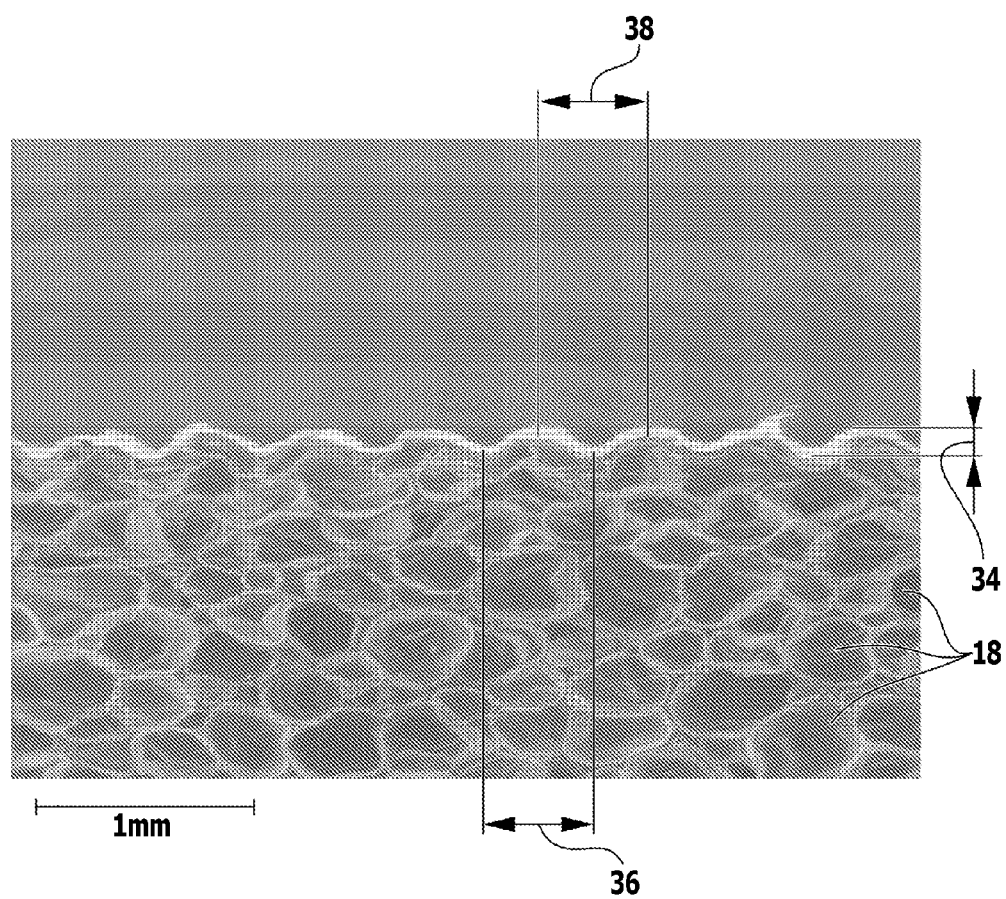
FIG. 5 shows a side view of certain sections of the washing element in FIG. 1, in a region provided with a surface texturing.

The section of the skins 24 and 26 provided with the surface texturing 28 occupies approximately a third of the length of the material strip 14 and is illustrated in side view in FIGS. 4 and 5. By contrast, the remaining section of the skins 24 and 26, adjoining the surface texturing 28 and extending as far as the second short side 32, is not provided with the surface texturing 28 and is illustrated with no hatching in FIG. 1. In the region of this section, the foam sheet 12 is formed, as in the side view illustrated in FIG. 2 and the plan view illustrated in FIG. 3, with a planar or substantially planar skin 24 and 26.

The surface texturing 28 will be described below, taking as an example the skin 24. Statements made in this regard also apply to the surface texturing 28 of the skin 26.

The skin 24 may be provided with the surface texturing 28 by subjecting the foam sheet 12 to a surface treatment step, after expansion in accordance with the configuration illustrated in FIGS. 2 and 3. To this end, the foam sheet 12 can be hot stamped, for example by heating a template of grid form as in the present case and pressing it against the skin 24. This results in a mechanical deformation of the skin 24 but leaves it undamaged, with the result that the foam sheet 12 continues to take the form of a closed-cell material after the embossing.

FIGS. 4 and 5 show the section of the foam sheet 12 provided with the surface texturing 28. It can be seen that the skin 24 is still intact. In contrast to the section of the foam sheet 12 that has not undergone the embossing, illustrated in FIGS. 2 and 3, the skin 24 has greater surface roughness in the region of the surface texturing 28. In the present case there is a level of surface roughness of for example approximately 140 µm, determined as variable Sz in Part 2 of ISO standard 25178 by the sum 34 of the highest peak of the skin 24 and the deepest valley of the skin 24. Here, it will be appreciated that the reference line from which the highest peak and the deepest valley are determined does not extend above the highest peak or below the deepest valley. By contrast, the surface roughness of the foam sheet 12 in its section not provided with the surface texturing 28 is approximately zero, because of the planar or substantially planar construction of the skin 24 there.

In the present case, the surface roughness of the skin 24 is substantially constant in the region of the surface texturing 28. This is because the foam sheet 12 is embossed, for the purpose of generating the surface texturing 28, with a template in the form of a homogenous grid of constant mesh size. For this reason, the surface texturing 28 is furthermore of regular construction along the surface 20 and has an approximately grid-like or scale-like form. In the present case, a spacing 36 between adjacent valleys in the surface texturing 28 is approximately 550 nm. Spacing 38 between two adjacent peaks in the surface texturing 28 is accordingly also approximately 550 µm.

As mentioned, the surface texturing 28 serves to increase the wettability by a washing liquid of the foam sheet 12 and to improve the mechanical removal of dirt from the article to be cleaned. This enables the cleaning action that can be achieved using the washing element 10 to be enhanced. At the same time, the likelihood that the article to be washed will be damaged can be reduced. On the one hand this is because, as mentioned, the skin 24 is intact even in the region of the surface texturing 28, that is to say the foam sheet 12 has closed cells and no dirt particles can collect in the cells 18. On the other, it has been found in practice that there is only a small likelihood that dirt particles will adhere even in the region of the surface texturing 28.

To further enhance the cleaning action, in certain sections the foam sheet 12 is divided into a plurality of strips 40. Eight strips 40 are provided in total. The strips 40 are produced by cutting into the foam sheet 12 provided with the surface texturing 28, starting from the first short side 30, in the direction of the second short side 30, over approximately a third of the length of the material strip 14.

The cuts reach into the material strip 14 by approximately the same amount as the skin 24 is provided with the surface texturing 28, starting from the first short side 30. The section of the skin 24 provided with the surface texturing 28 defines the region of the washing element 10 that actively participates in washing, which during cleaning conventionally comes into contact with the article to be cleaned. Thus, the strips 40 also extend approximately over the entire region of the washing element 10 that actively participates in washing.

In a practical implementation of the washing element 10, it has proved favorable if the width of the strips 40 is at least approximately 4 mm, in particular with a thickness of the foam sheet 12 of approximately 2 mm to approximately 3 mm. As a result, it is largely possible to avoid dirt particles accumulating at the sides of the strips 40 that are provided with open cells 18 and possibly resulting in damage to the article to be washed.

Instead of the grid-like or scale-like surface texturing 28 illustrated in the present case, it is conceivable for a surface texturing having a ribbed or pimpled configuration to be formed on the skin 24. To this end, it may be provided for the foam sheet 12 to be embossed using a template that is of strip form or provided with blind holes.

It is further conceivable for the surface roughness of the skin 24 to have a different value in the region of the surface texturing 28 than the approximately 140 μm that is illustrated in the present case. For example, in a practical construction of a variant on the washing element it has proved advantageous if the surface roughness is approximately 50 μm to approximately 1000 μm, preferably approximately 100 μm to approximately 500 μm.

It may further be provided for the spacing between adjacent valleys and the spacing between adjacent peaks to differ from the illustrated spacings 36 and 38 of in each case approximately 550 μm. For example, the spacing between adjacent valleys and/or the spacing between adjacent peaks is approximately 1.5 mm to approximately 2.5 mm, in particular with a surface roughness of approximately 200 μm to approximately 500 μm.

Figure 6:
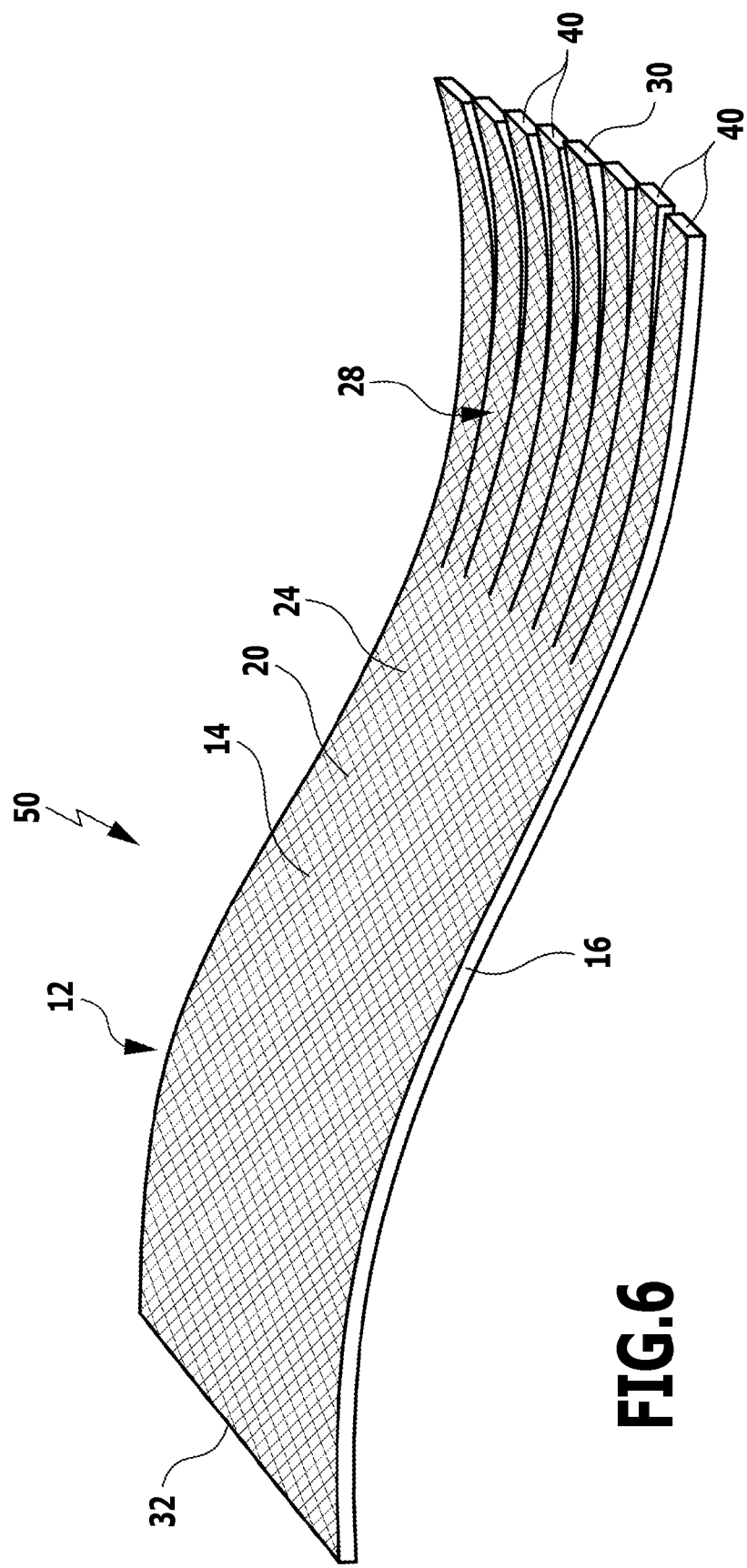
FIG. 6 shows a schematic perspective illustration of a second preferred embodiment of a washing element in accordance with the invention.

A second preferred embodiment of a washing element in accordance with the invention is shown in FIG. 6 in schematic perspective illustration and overall is designated there by the reference numeral 50. For like and equivalent features of the washing elements 10 and 50, the same reference numerals are used. The advantages which may be achieved with the washing element 10 may also be achieved with the washing element 50.

The only way in which the washing element 50 differs from the washing element 10 is that the skins 24 and 26 are each completely provided with the surface texturing 28, that is over the entire width of the material strip 14 and from the first short side 30 to the second short side 32.

To use the washing elements 10 and 50 in a washing system, in particular an automatic motor vehicle washing system, they may be secured by means of their end having the second short side 32 for example to a rotating shaft. As the shaft rotates, the strips 40 in the region that actively participates in washing can then clean off the article to be washed.

That which is claimed:

1. A washing element for a washing system, in particular an automatic motor vehicle washing system, the washing element being formed by a foam material, wherein the washing element is a foam sheet comprising cells and which has at least on one side a skin, wherein the skin is a foam process skin formed during expansion of the foam sheet and which overlies the cells of the foam sheet to form a closed surface, wherein the skin is provided, at least in certain sections, with a surface texturing comprising a plurality of valleys and a plurality of peaks such that the surface roughness of the foam sheet in the region of the surface texturing is increased.

2. The washing element in accordance with claim 1, wherein the foam sheet has a skin on both sides.

3. The washing element in accordance with claim 2, wherein the two skins are each provided with a surface texturing in certain sections.

4. The washing element in accordance with claim 1, wherein at least one skin of the foam sheet is completely provided with the surface texturing.

5. The washing element in accordance with claim 1, wherein a surface roughness of the skin in the region of the surface texturing is of the same value or substantially the same value.

6. The washing element in accordance with claim 1, wherein the skin has a surface roughness in the region of the surface texturing of approximately 50 μm to approximately 1000 μm, measured as variable Sz in Part 2 of ISO standard 25178.

7. The washing element in accordance with claim 6, wherein the skin has a surface roughness in the region of the surface texturing of approximately 100 μm to approximately 500 μm, measured as variable Sz in Part 2 of ISO standard 25178.

8. The washing element in accordance with claim 6, wherein the skin has a surface roughness in the region of the surface texturing of approximately 200 μm to approximately 400 μm, measured as variable Sz in Part 2 of ISO standard 25178.

9. The washing element in accordance with claim 1, wherein the surface texturing is formed to be regular, at least in certain regions.

10. The washing element in accordance with claim 1, wherein at least one of a spacing between adjacent valleys in the surface texturing and a spacing between adjacent peaks in the surface texturing are of the same size or substantially the same size.

11. The washing element in accordance with claim 1, wherein the surface texturing is configured as a grid-like structure, ribbed structure, scale-like structure or pimpled structure.

12. The washing element in accordance with claim 1, wherein the washing element is divided into strips, at least in certain sections.

13. The washing element in accordance with claim 12, wherein the strips are provided with a surface texturing.

14. The washing element in accordance with claim 1, wherein the foam sheet is a polyolefin foam sheet.

15. The washing element in accordance with claim 1, wherein the skin is substantially planar in its sections not provided with the surface texturing.

16. A method for manufacturing a washing element for a washing system, wherein a foam sheet comprising cells and which has a skin on at least one side, wherein the skin is a foam process skin formed during expansion of the foam sheet and which overlies the cells of the foam sheet to form a closed surface, is subjected to at least one surface treatment step in which the skin is provided, at least in certain sections, with a surface texturing, increasing its surface roughness, wherein the surface texturing comprises a plurality of valleys and a plurality of peaks.

17. The method in accordance with claim 16, wherein the surface texturing is constructed by embossing the skin of the foam sheet.

* * * * *